United States Patent
Salter et al.

(10) Patent No.: US 12,496,958 B2
(45) Date of Patent: Dec. 16, 2025

(54) LAST MILE DELIVERY SYSTEM

(71) Applicant: Ford Global Technologies, LLC, Dearborn, MI (US)

(72) Inventors: Stuart C. Salter, White Lake, MI (US); Arnav Wagh, Detroit, MI (US); David Brian Glickman, Southfield, MI (US); Pietro Buttolo, Dearborn Heights, MI (US); Brendan Diamond, Grosse Pointe, MI (US)

( * ) Notice: Subject to any disclaimer, the term of this patent is extended or adjusted under 35 U.S.C. 154(b) by 386 days.

(21) Appl. No.: 18/333,092

(22) Filed: Jun. 12, 2023

(65) Prior Publication Data

US 2024/0409023 A1     Dec. 12, 2024

(51) Int. Cl.
*B60P 7/00* (2006.01)
*B60P 7/08* (2006.01)
*B60P 7/10* (2006.01)
*B60R 16/03* (2006.01)

(52) U.S. Cl.
CPC ............... *B60P 7/10* (2013.01); *B60P 7/0815* (2013.01); *B60R 16/03* (2013.01)

(58) Field of Classification Search
CPC ........... B60P 7/10; B60P 7/0815; B60R 16/03
See application file for complete search history.

(56) References Cited

U.S. PATENT DOCUMENTS

| | | | |
|---|---|---|---|
| 10,397,495 B1 * | 8/2019 | Graber | B64F 1/24 |
| 10,503,164 B2 | 12/2019 | Ibe | |
| 10,706,382 B2 | 7/2020 | Gil | |
| 10,934,093 B2 | 3/2021 | Gil | |
| 11,840,400 B2 * | 12/2023 | Moradnia | G05D 1/0293 |
| 2019/0108485 A1 | 4/2019 | Harvey | |
| 2020/0354057 A1 | 11/2020 | Polus | |

OTHER PUBLICATIONS

Safaa Sindi, et al., Autonomous Goods Vehicles For Last-Mile Delivery: Evaluation of Impact and Barriers, IEEE, Sep. 2020, 1-6.

* cited by examiner

*Primary Examiner* — Steven O Douglas
(74) *Attorney, Agent, or Firm* — Emily Drake; Eversheds Sutherland (US) LLP (57) ABSTRACT

A vehicle is described. The vehicle may include a vehicle sensor configured to detect cart location, and a lifting mechanism disposed at a vehicle sidewall. The lifting mechanism is configured to lift and secure a cart on a target location on the vehicle sidewall. The vehicle may further include a memory and a processor. The processor is configured to obtain the cart location from the vehicle sensor, determine that the cart is aligned with the target location. Responsive to a determination that the cart is aligned, the processor is configured to transmit a command signal to the lifting mechanism to lift and secure the cart on the target location.

20 Claims, 5 Drawing Sheets

LAST MILE DELIVERY SYSTEM

TECHNICAL FIELD

The present disclosure relates to a last mile delivery system, and more particularly, to a last mile delivery system that facilitates aligning, lifting, and powering of a cart in a delivery vehicle.

BACKGROUND

With the continued growth of internet-based commerce, package delivery is increasingly used to deliver goods to customers. Specifically in the US, e-commerce business is expected to continue to grow in the years to come.

Unprecedented growth is received favorably by e-commerce companies; however the rapid growth also leads to operational challenges in the supply chain. E-commerce companies and their delivery partners deliver an ever-increasing number of packages per day, while reducing resource expenditure (e.g., delivery time, labor, etc.).

Various approaches are currently used to optimize delivery of packages. For example, a delivery partner may load multiple packages in a wheeled cart, and may roll the cart inside the delivery vehicle to ease the process of loading packages into the vehicle. The delivery partner may additionally place packages with similar delivery addresses in a same cart to gain efficiency in unloading packages. Although use of carts may ease the process of loading and unloading the packages, securing carts inside the vehicle may still be challenging for the delivery partner. Securing the carts inside the vehicle is important to ensure that carts do not move when the vehicle may be travelling.

Thus, there still exists a need for a system that facilitates securing of carts inside the delivery vehicle.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a delivery vehicle for delivering a plurality of packages on a delivery route. The packages may be placed in one or more carts that may be secured inside the delivery vehicle. The delivery vehicle may facilitate aligning, lifting, and powering of the cart inside the delivery vehicle. The delivery vehicle may include a lifting mechanism(s) that may be disposed on a vehicle sidewall. The lifting mechanism may be configured to engage with the cart, and lift the cart above a vehicle floor. The lifting mechanism may further secure the cart in the lifted position (e.g., at a target location on the vehicle sidewall).

In some aspects, the delivery vehicle may include a cart management system ("system") that may be configured to obtain cart location inside the delivery vehicle from one or more vehicle sensors (such as vehicle cameras, radar sensors, etc.) or sensors disposed in the cart. The system may determine that the cart may be aligned relative to the target location based on the obtained cart location. For example, the system may determine that the cart may be located in a predefined orientation/position in proximity to the target location based on the cart location. Responsive to a determination that the cart may not be aligned, the system may provide instructions to a vehicle operator, via a user device or a vehicle audio/visual component, to align the cart correctly relative to the target location. On the other hand, responsive to a determination that the cart may be aligned, the system may transmit a command signal to the lifting mechanism to engage with the cart. The lifting mechanism may receive the command signal, and lift and secure the cart above the vehicle floor.

In additional aspects, the delivery vehicle may include a power source that may supply power to the cart when the cart may be secured to the target location. In some aspects, the power source may be disposed on the vehicle sidewall and may include an inductive power transfer coil (or charging pads). The cart may receive power from the inductive power transfer coil, and may use the power to actuate one or more cart electric components, e.g., Light Emitting Diodes (LEDs). In an exemplary aspect, the system may control power source operation, such that the cart electric components may be actuated based on command signals provided by the system.

The present disclosure discloses a delivery vehicle that facilitates in lifting and securing the cart above the vehicle floor, and prevents cart movement when the delivery vehicle may be moving. Further, the delivery vehicle provides assistance in aligning the cart to the target location using existing vehicle components, and may thus not require external components. In addition, the delivery vehicle provides assistance to the vehicle operator during package unloading operation. Specifically, the delivery vehicle may provide visual and/or audio guidance, thereby minimizing human error during package unloading.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
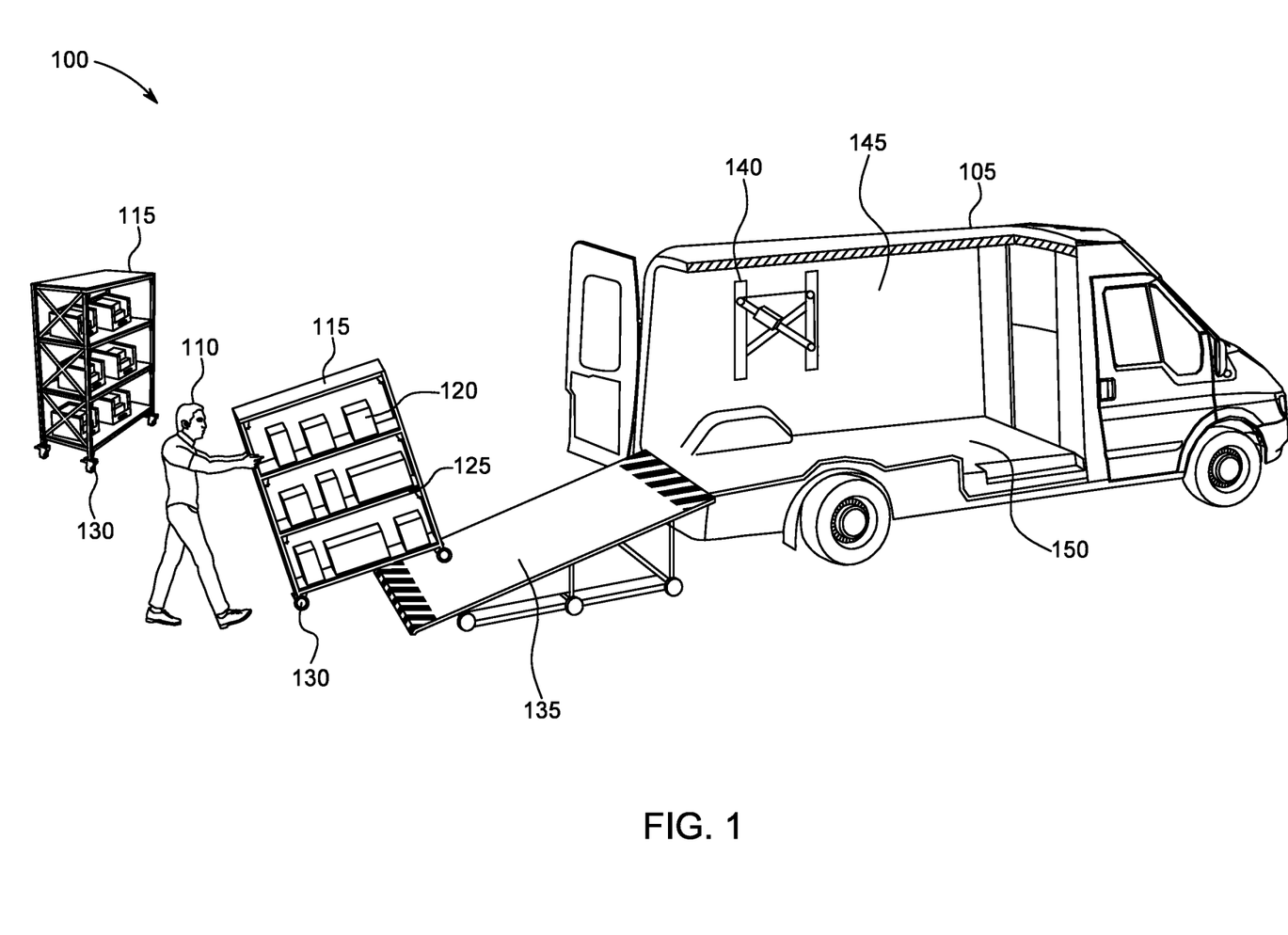
FIG. 1 depicts an example system in which techniques and structures for providing the systems and methods disclosed herein may be implemented.

FIG. 1 depicts an example system 100 in which techniques and structures for providing the systems and methods disclosed herein may be implemented. The system 100 may include a delivery vehicle 105, and an operator 110 (or a robot) that may load one or more carts 115 (hereinafter referred to as cart 115) in the delivery vehicle 105.

The delivery vehicle 105 may include, but is not limited to, a truck, a van (including walk-in vans), a truck trailer, and/or the like. In some aspects, the delivery vehicle 105 may be an autonomous vehicle. In other aspects, a driver (such as the operator 110) may operate the delivery vehicle 105.

The cart 115 may hold/store package(s) 120 to be delivered to respective package destination locations. In some aspects, the cart 115 may be open, as shown in FIG. 1. In other aspects, the cart 115 may be closed (and may have an open front or top portion to load/unload the package(s) 120). The cart 115 may include a plurality of shelves 125 configured to hold the package(s) 120. Stated another way, the operator 110 may place the packages 120 on the shelves 125. In additional aspects, the cart 115 may include a plurality of bins (not shown) in which the operator 110 may place the packages 120. The bins may be attached or placed on the shelves 125. Each bin may be configured to hold or store one or more packages 120, depending on bin dimensions and package dimensions, weight, package destination locations, etc. Further, each package 120 may be of any shape, dimension, and weight; and may enclose different types of delivery content. The delivery content may include, but is not limited to, books, electronic items, home décor items, fragile items, and/or the like.

The cart 115 may include caster wheels 130 that may to enable cart movement inside or outside the delivery vehicle 105. For example, the operator 110 may push the cart 115 over an inclined track 135 (or ramp) and load the cart 115 inside the delivery vehicle 105 using the caster wheels 130. The track 135 may be removable attached to the delivery vehicle 105 and may assist the operator 110 to roll the cart 115 from outside to inside the delivery vehicle 105. In some aspects, the cart 115 may include an electronic control system (e.g., self-propulsion and steering means (not shown)) that may be configured to enable the cart 115 to move/load automatically inside or outside the delivery vehicle 105. The cart 115 may further include handle locks, brakes, or other components (not shown) that may assist cart 115 placement inside the delivery vehicle 105.

The delivery vehicle 105 may include a lifting mechanism 140 that may be located/disposed at a vehicle sidewall 145. The lifting mechanism 140 may be configured to engage with the cart 115 when the cart 115 may be located inside the delivery vehicle 105 (e.g., in a predefined location and orientation), and lift the cart 115 above a vehicle floor 150. In some aspects, the lifting mechanism 140 may lift the cart 115 such that the caster wheels 130 may be disposed a predefined distance above the vehicle floor 150. The predefined distance may be in a range of 0.5 to 2 inches.

The lifting mechanism 140 may further secure the cart 115 to a target location on the vehicle sidewall 145 responsive to lifting the cart 115. Lifting and securing the cart 115 on the vehicle sidewall 145 (and above the vehicle floor 150) may ensure that the cart 115 does not move when the delivery vehicle 105 may be travelling. The lifting mechanism 140 may be a lever-based mechanism. In some aspects, the lifting mechanism may be motor-actuated. The details of the lifting mechanism 140 are described below in conjunction with FIGS. 2-4.

The delivery vehicle 105 may further include a guiding mechanism (shown as guiding mechanism 405 in FIG. 4) on the vehicle floor 150. The guiding mechanism may include guiding paths, e.g., tracks or groves that may guide cart movement on the vehicle floor 150. The guiding mechanism may guide cart movement inside the delivery vehicle 105 such that the cart 115 may be properly aligned relative to the target location at which the cart 115 may be lifted by the lifting mechanism 140. When the delivery vehicle 105 may be properly aligned with the target location, the lifting mechanism 140 may engage with the cart 115 and lift the cart 115 above the vehicle floor 150.

The delivery vehicle 105 may additionally include a cart management system (shown as cart management system 210, in FIG. 2) that be configured to manage cart movement (and cart lift operation off the vehicle floor 150) inside the delivery vehicle 105. The system may obtain cart location from one or more vehicle sensor(s) (such as interior vehicle cameras, radar sensors, etc.) or sensors that may be disposed on the cart 115, when the operator 110 moves the cart 115 inside the delivery vehicle 105. Responsive to obtaining the cart location, the system may determine whether the cart 115 is properly aligned with the target location to enable cart lift-off from the vehicle floor 150. Responsive to a determination that the cart 115 may not be aligned, the system may provide instructions to a user device (not shown) associated with the operator 110 or vehicle components to move the cart 115 such that the cart 115 may be properly aligned. For example, the system may instruct the operator 110 or may assist the operator 110 to reach to the target location in the delivery vehicle 105 by using vehicle interior audio or visual components such as interior vehicle projector, a Light Emitting Diode (LED) coupled to the delivery vehicle 105, a vehicle speaker, a vehicle display system, etc. In further aspects, the system may be configured to provide the instructions to the cart 115 to move the cart 115 automatically to the target location.

Responsive to a determination that the cart 115 may be properly aligned, the system may be transmit a command signal to the lifting mechanism 140 to engage with the cart 115. Responsive to receiving the command signal, the lifting mechanism 140 may engage with the cart 115, and then lift and secure the cart 115 to the target location on the vehicle sidewall 145.

In some aspects, the delivery vehicle 105 may include a power source (shown as power source 425 in FIG. 4) that may be configured to supply power to the cart 115, e.g., when the cart 115 may be secured to the target location on the vehicle sidewall 145. In some aspects, the power source may be disposed on the vehicle sidewall 145 and may include an inductive power transfer coil (or charging pads). The cart 115 may receive power from the inductive power transfer coil, and may use the power to actuate one or more cart electric components, e.g., Light Emitting Diodes (LEDs).

Figure 2:
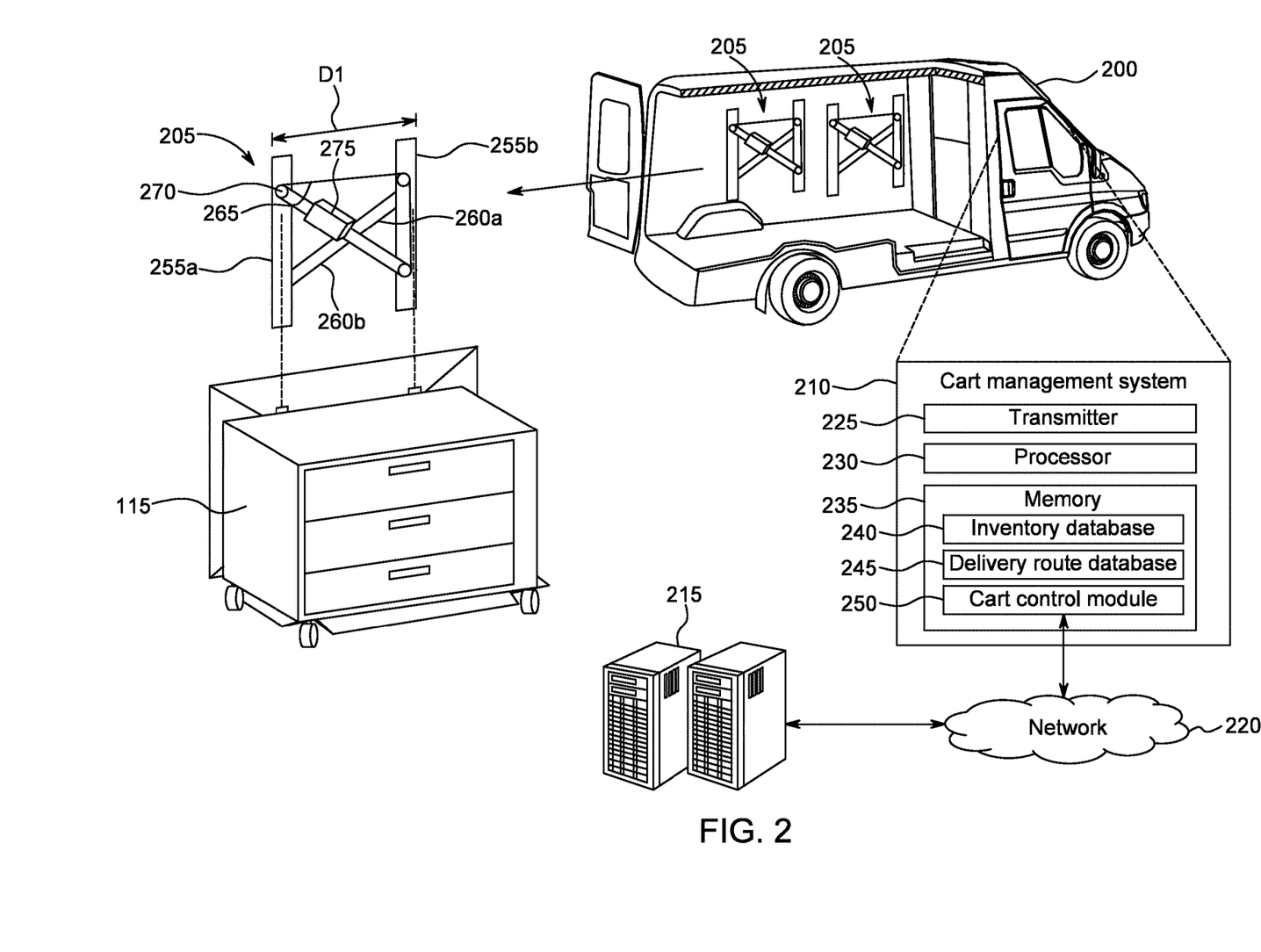
FIG. 2 illustrates an example delivery vehicle with a lifting mechanism and a cart management system in accordance with the present disclosure.
Figure 3:
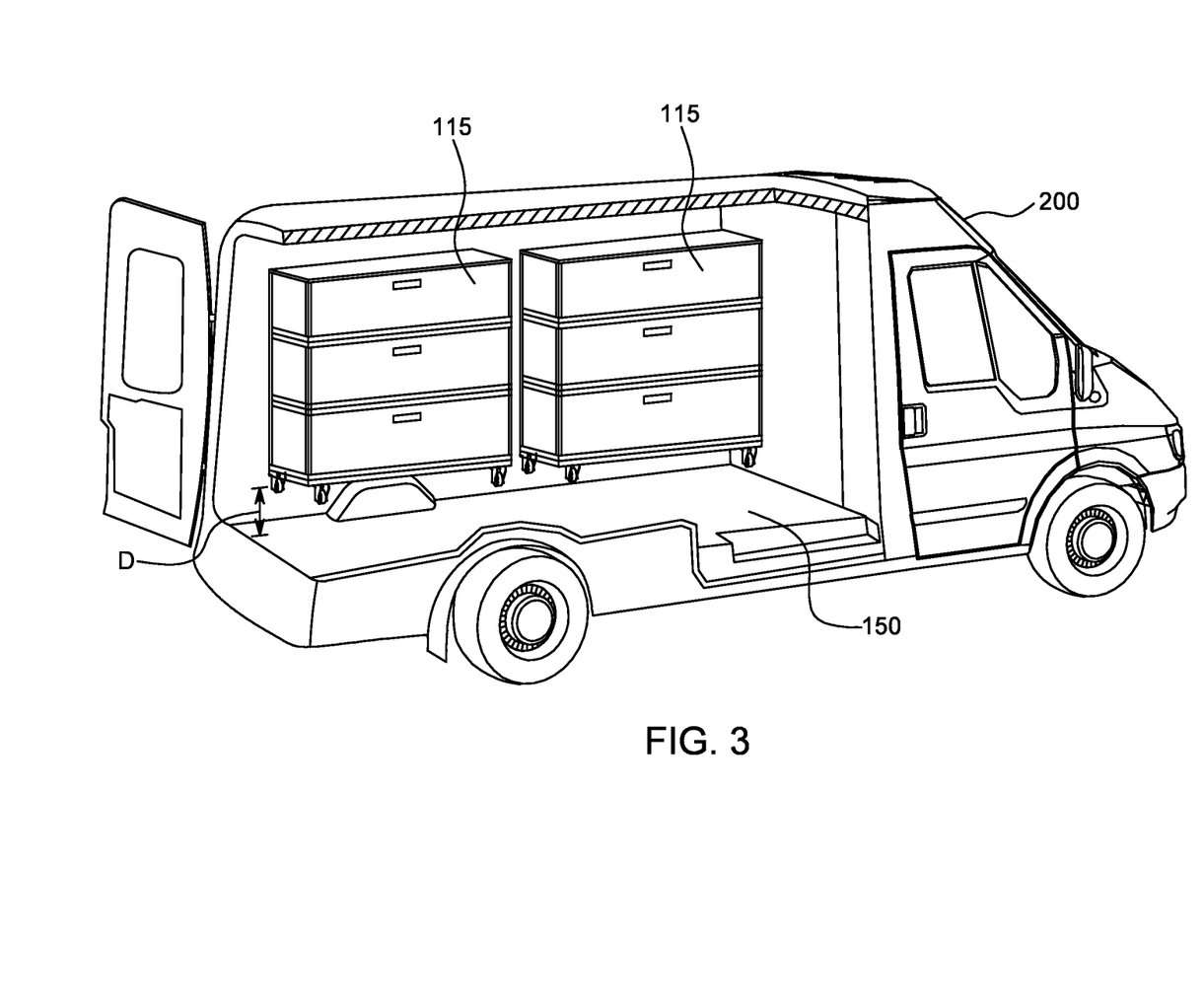
FIG. 3 illustrates an example loaded delivery vehicle in accordance with the present disclosure.
Figure 4:
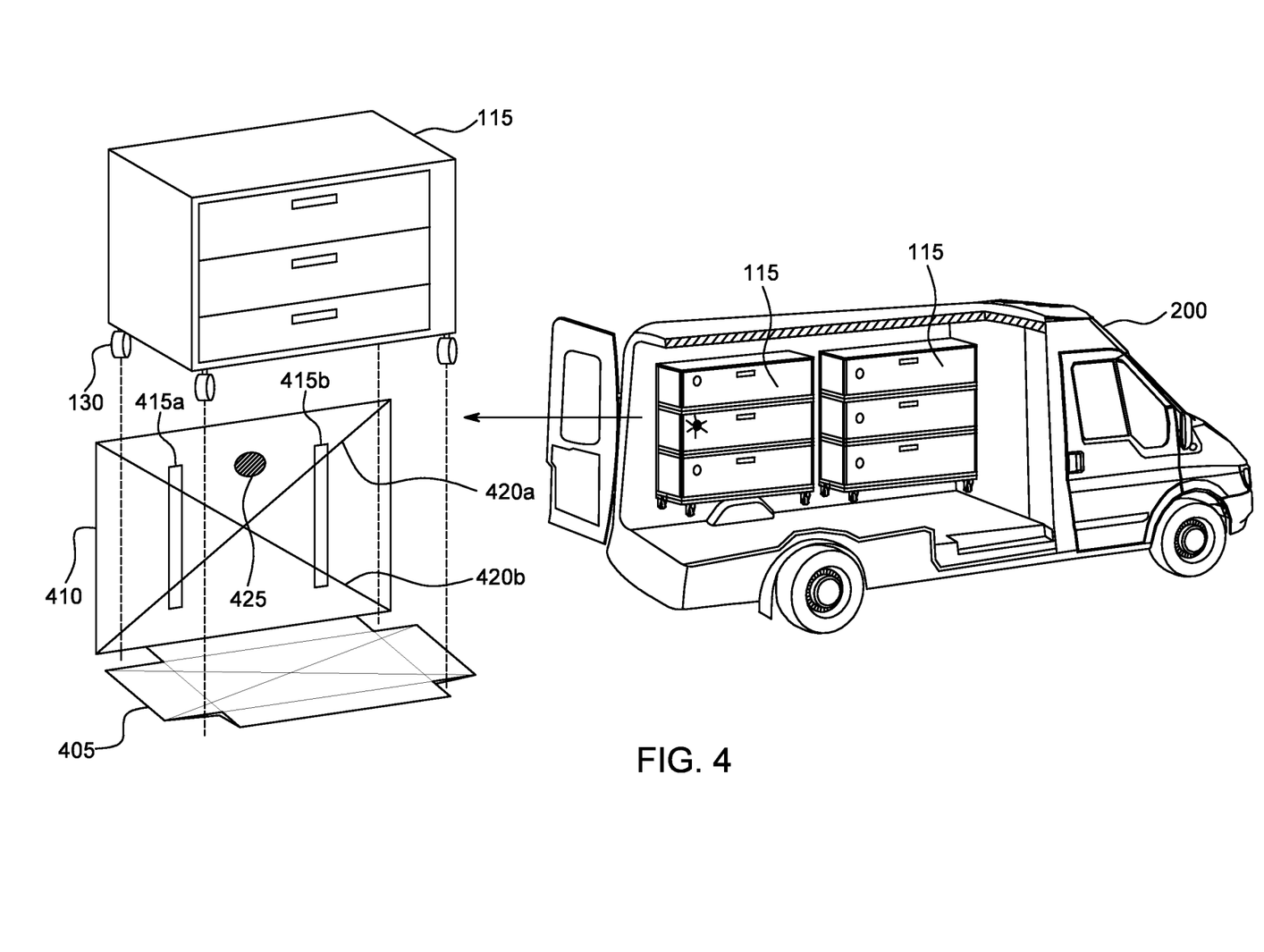
FIG. 4 depicts an example delivery vehicle with power source in accordance with the present disclosure.

FIG. 2 illustrates an example delivery vehicle 200 with a lifting mechanism 205 and a cart management system 210 in accordance with the present disclosure. The delivery vehicle 200 may be same as the delivery vehicle 105, and the lifting mechanism 205 may be same as the lifting mechanism 140. While describing FIG. 2, references may be made to FIGS. 3 and 4. FIG. 3 illustrates an example loaded delivery vehicle (e.g., when the delivery vehicle 200 may be loaded with one or more carts) in accordance with the present disclosure, and FIG. 4 depicts the delivery vehicle 200 with a power source 425 in accordance with the present disclosure.

The system 210, as described herein, can be implemented in hardware, software (e.g., firmware), or a combination thereof. The system 210 may be part of an on-board computer (not shown) of the delivery vehicle 200 and may communicatively couple with one or more servers 215 (or a server 215), via one or more networks 220 (or a network 220).

The network 220 may be, for example, a communication infrastructure in which the connected devices discussed in various embodiments of this disclosure may communicate. The network 220 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The server 215 may be part of a cloud-based computing infrastructure and may be associated with and/or include a Telematics Service Delivery Network (SDN) that provides digital data services to the delivery vehicle 200 and other vehicles (not shown in FIG. 3), that may be part of a vehicle fleet. In additional aspects, the server 215 may be associated with a package delivery partner or an E-commerce operator that may facilitate the delivery vehicle 200 to deliver the packages 120 to respective package customers/destination locations.

As described above, the system 210 may facilitate in aligning, lifting, securing, and powering the cart 115 in the delivery vehicle 200. The system 210 may include a plurality of components including, but not limited to, a transceiver 225, a processor 230 and a memory 235, which may communicatively couple with each other.

The memory 235 may store programs in code and/or store data for performing various system 210 operations in accordance with the present disclosure. Specifically, the processor 230 may be configured and/or programmed to execute computer-executable instructions stored in the memory 235 for performing various system 210 functions in accordance with the disclosure. Consequently, the memory 235 may be used for storing code and/or data code and/or data for performing operations in accordance with the present disclosure.

In one or more embodiments, the processor 230 may be disposed in communication with one or more memory devices (e.g., the memory 235 and/or one or more external databases (not shown in FIG. 2)). The memory 235 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 235 may be one example of a non-transitory computer-readable medium and may be used to store programs in code and/or to store data for performing various operations in accordance with the disclosure. The instructions in the memory 235 can include one or more separate programs, each of which can include an ordered listing of computer-executable instructions for implementing logical functions.

The memory 235 may include one or more databases and/or modules. Examples of such databases/modules include, but are not limited to, an inventory database 240, a delivery route database 245, and a cart control module 250. The cart control module 250, as described herein, may be stored in the form of computer-executable instructions, and the processor 230 may be configured and/or programmed to execute the stored computer-executable instructions for performing system 210 functions in accordance with the present disclosure.

The transceiver 225 may be configured to receive information associated with the packages 120 and the cart 115 from an external database/server (e.g., the server 215), and may store the package information and the cart information in the inventory database 240. The package information may include, for example, package customer details (including package destination locations), package delivery schedules and delivery status, package content information, package position in the cart 115, and/or the like. The cart information may include, for example, a target location for each cart 115 in the delivery vehicle 200, identifiers of packages stored in each cart 115, and/or the like. The target location, as described herein, may be associated to a location on the vehicle sidewall 145, where the cart 115 may be secured. The processor 230 may be configured to obtain the target location from the inventory database 240, and may control cart movement and lift operation (e.g., align, lift, and secure the cart 115 to the target location) inside the delivery vehicle 200 by using the instructions stored in the cart control module 250. The transceiver 225 may be further configured to transmit instructions to a user device associated with the operator 110 or other vehicle components (including the lifting mechanism 205, vehicle interior camera, vehicle audio and visual component) to control the cart movement and lift operation.

The transceiver 225 may be further configured to receive inputs from one or more sensors (not shown) installed in the delivery vehicle 200 (or the cart 115). The sensors may be, for example, vehicle interior cameras, radar sensors, and/or the like. In some aspects, the transceiver 225 may receive a cart location inside the delivery vehicle 200 from the sensors. In an exemplary aspect, the transceiver 225 may receive the cart location at a predefined frequency (e.g., every 100 milliseconds) from the sensors, when the operator 110 loads or moves the cart 115 inside the delivery vehicle 200.

The transceiver 225 may be further configured to receive delivery route details associated with the delivery vehicle 200 and/or navigation instructions from the server 215. The navigation instructions may assist a delivery vehicle operator (or an autonomous vehicle controller) to drive the delivery vehicle 200 on the delivery route. In some aspects, the delivery route may be based on package delivery schedule. The transceiver 225 may store the received delivery route details/navigation instructions in the delivery route database 245. During transit, the processor 230 may obtain the delivery route details from the delivery route database 245, and may assist the delivery vehicle operator (or the autonomous vehicle) to deliver correct package at correct package destination location.

In operation, the processor 230 may be configured to obtain the cart location (e.g., real-time cart location) from the transceiver 225 when the cart 115 may be rolled into the delivery vehicle 200. Responsive to obtaining the cart location, the processor 230 may determine whether the cart 115 is aligned with the target location. Responsive to a determination that the cart 115 may not be aligned with the target location, the processor 230 may provide instructions/notification, via the transceiver 225, to the user device associated with the operator 110 or the vehicle components to align the cart 115 with the target location. For example, the processor 230 may instruct the operator 110 to move the cart 115 along the tracks (e.g., guiding mechanism 405 as shown in FIG. 4), and position the cart 115 near to a vehicle sidewall (e.g., the vehicle sidewall 145). As described above in conjunction with FIG. 1, the processor 230 may assist or instruct the operator 110 to reach to the target location in the delivery vehicle 200 by using one or more vehicle interior audio and/or visual components (e.g., interior vehicle projector, LEDs, vehicle speaker, vehicle HMI, etc.).

In further aspects, the processor 230 may be configured to transmit instructions to the cart 115 to move the cart 115 automatically to the target location, using the self-propulsion and steering means (not shown) located in the cart 115. In this case, the processor 230 may additionally transmit navigation directions to the cart 115 and enable cart movement to the target location. The cart 115 may receive the instructions and move based on the instructions and the navigation directions.

On the other hand, responsive to a determination that the cart 115 may be aligned with the target location, the processor 230 may transmit (via the transceiver 225) a command signal to the lifting mechanism 205 to engage with the cart 115. In some aspects, the command signal may "actuate" (or turn ON) the lifting mechanism 205. Responsive to receiving the command signal, the lifting mechanism 205 may engage with the cart 115 and lift the cart 115 a predefined distance "D" (e.g., 0.5-2 inches) above the vehicle floor 150, as shown in FIG. 3. The lifting mechanism 205 may further secure/hold the cart 115 in the lifted position (e.g., at the target location) when the cart 115 may be lifted. Securing the cart 115 above the vehicle floor 150 may ensure that the cart 115 does not move when the driver drives the delivery vehicle 200 along the delivery route.

In some aspects, the delivery vehicle 200 may include one or more lifting mechanisms 205. For example, FIG. 2 depicts two lifting mechanisms 205. A count of lifting mechanisms 205 in the delivery vehicle 200 may be based on a count of carts 115 that the delivery vehicle 200 may be expected to load. In some aspects, one lifting mechanism may be present in the delivery vehicle 200 for one cart. Therefore, the delivery vehicle 200 may include four lifting mechanisms 205 when the delivery vehicle 200 may be expected to load four carts 115. Further, the plurality of lifting mechanisms may be disposed at different vehicle locations. For example, the lifting mechanisms may be disposed parallel to each other on the vehicle sidewall 145, above the vehicle floor 150 as shown in FIG. 2. In other aspects, the lifting mechanisms may be disposed in any other arrangement.

The lifting mechanism 205 may be of any dimension, and may be based on cart 115 dimensions. In some aspects, the lifting mechanism 205 may include a lever-based arrangement (not shown) that may enable the operator 110 to lift the cart 115 off the vehicle floor 150. In such a scenario, the processor 230 may transmit instructions to the operator 110 (via the user device or the vehicle audio and visual component) to lift and secure the cart 115 manually, when the cart 115 may be aligned relative to the target location. The operator 110 may then manually lift the cart 115 using the lever-based arrangement, and secure the cart 115 on the target location. In other aspects, the lifting mechanism 205 may include a motor-actuated arrangement that may automatically lift the cart 115 off the vehicle floor 150, as described below.

The lifting mechanism 205 may include a first vertical member 255a and a second vertical member 255b. The first vertical member 255a may have similar dimensions as second vertical member 255b dimensions. The second vertical member 255b may be disposed at a predefined distance "D1" from the first vertical member 255a. The distance D1 may vary based on delivery vehicle dimensions and/or dimensions of the cart may be expected to be loaded in the delivery vehicle 200. The first vertical member 255a and the second vertical member 255b may be solid or hollow, and may be any shape and dimensions. For example, the first vertical member 255a and the second vertical member 255b may be rectangular, and may have a length that may depend on the delivery vehicle dimensions and/or cart dimensions. The first vertical member 255a and the second vertical member 255b may be made of any material including, but not limited to, steel, iron, aluminum, a combination thereof, and/or the like.

The lifting mechanism 205 may further include a first cross-tube 260a and a second cross-tube 260b, which may be connected between the first vertical member 255a and the second vertical member 255b. The first cross-tube 260a and the second cross-tube 260b may be connected diagonally (e.g., in "X" shape) between the first vertical member 255a and the second vertical member 255b, thereby enhancing lifting mechanism stability. The first cross-tube 260a may have similar dimensions as second cross-tube 260b dimensions. The first cross-tube 260a and the second cross-tube 260b may be solid or hollow, and may be any shape and dimensions. For example, the first cross-tube 260a and the second cross-tube 260b may be rectangular, and may have a length that may depend on the delivery vehicle dimensions and/or cart dimensions. The first cross-tube 260a and the second cross-tube 260b may be made of any material including, but not limited to, steel, iron, aluminum, a combination thereof, and/or the like.

The lifting mechanism 205 may additionally include cables 265 that may be engaged with the cart 115 via one or more pulleys 270 to lift the cart 115 off the vehicle floor 150. In this case, the cart 115 may include one or more attachment means (not shown) at a cart back surface that may engage with the cables 265, and enable the lifting mechanism 205 to lift the cart 115. The lifting mechanism 205 may further include a motor 275 that may be connected to the first cross-tube 260a or the second cross-tube 260b. Alternatively, the motor 275 may be connected at any other location. The motor 275 could be servo motor, stepper motor, brushed DC motor, and/or the like. The motor 275 may be configured to actuate cable movement, and lift the cart 115 when the cables 265 may be engaged with the cart 115. In some aspects, the processor 230 may be configured to control motor operation to lift and secure the cart 115 to the target location. For example, the processor 230 may actuate the motor 275 (by transmitting the command signal) when the processor 230 determines that the cart 115 may be aligned with the target location. Responsive to actuation, the motor 275 may control cable movement such that the cables 265 may be engaged with the cart 115 and lift the cart 115 off the vehicle floor 150. The processor 230 may further cause the cables to secure the cart 115 at the target location in the lifted position.

In some aspects, the delivery vehicle 200 may include an engagement structure 410 (shown in FIG. 4) that may enable the cart 115 to engage with the vehicle sidewall 145. In some aspects, the engagement structure 410 may be integrated to the vehicle sidewall 145. In other aspects, the engagement structure 410 may be removably attached to the vehicle sidewall 145 (e.g., the engagement structure 410 may be a frame that may be attached to the vehicle sidewall 145). Engagement structure dimensions may depend on the delivery vehicle dimensions and/or the cart dimensions.

The engagement structure 410 may include a first vertical strip 415a and a second vertical strip 415b. The first vertical strip 415a and the second vertical strip 415b may include interfacing holes/features, which may be configured to engage the first vertical strip 415a and the second vertical strip 415b with the first vertical member 255a and the second vertical member 255b, respectively (e.g., to engage the cart 115 with the vehicle sidewall 145). The first vertical strip 415a and the second vertical strip 415b may be located anywhere on the vehicle sidewall 145, and the location may be customized based on cart dimensions. The dimensions of the first vertical strip 415a and the second vertical strip 415b may correspond to dimensions of the first vertical member 255a and the second vertical member 255b. In some aspects, the engagement structure 410 may include additional vertical strips (not shown) to engage additional carts with the vehicle sidewall 145.

The engagement structure 410 may further include a first cross-tube 420a and a second cross-tube 420b that may be connected diagonally (e.g., in "X" shape) between an engagement structure 410 left side and an engagement structure 410 right side, and may provide structure stability to the engagement structure 410.

In some aspects, the engagement structure 410 may be coupled to the guiding mechanism 405, as shown in FIG. 4. The guiding mechanism 405 may be integrated to the vehicle floor 150. In other aspects, the guiding mechanism 405 may be removably attached to the vehicle floor 150 (e.g., the guiding mechanism 405 may be a frame/plate that may be attached to the vehicle floor 150). The guiding mechanism 405 may have any dimensions depending upon delivery vehicle dimensions (e.g., vehicle floor size). The guiding mechanism 405 may include tracks or grooves that may guide cart movement such that the cart 115 may be aligned with the target location (at which the cables 265 may lift the cart 115). In some aspects, the processor 230 may also light up the tracks to the target location via vehicle floor 150 lighting components, to assist the operator 110 move the cart 115 to the target location. The operator 110 may follow the illuminated path to reach to the target location. In addition, the processor 230 may provide instructions to the operator 110, e.g., via the vehicle speaker (or any other component), to reach to the target location. For example, the processor 230 may receive cart 115 location from the vehicle camera or radar sensors and may be configured to guide cart movement (e.g., provide turn-by-turn notification) using the vehicle speaker such that the cart 115 may be guided towards the target location.

The engagement structure 410 may further include a power source 425 (or a plurality of power sources) that may be configured to provide power supply to the cart 115. The power source 425 may be configured to supply electric energy to one or more cart electric components. For example, the power source 425 may power cart lighting system (e.g., LEDs that may be disposed on the cart 115). The lighting system may be attached to a cart front surface. For example, the LEDs may be disposed at cart 115 front edges. In some aspects, the processor 230 may control power source operation to illuminate the LEDs via the power source 425, which enables the operator 110 to identify correct package to be delivered at a destination location. In further aspects, the power source 425 may be positioned in proximity to the lifting mechanism 205, and supply power to the lifting mechanism 205 to enable the lifting mechanism 205 to lift and secure the cart 115, via the motor 275. In some aspects, the power source 425 may include an inductive power transfer coil that may inductively couple with the cart 115.

Although FIG. 4 depicts one power source 425, in some aspects, the engagement structure 410 may include a plurality of power sources. The power sources may be disposed in any pattern, e.g., horizontally or any other pattern, and may be aligned with corresponding attachments disposed on the cart 115 to enable power transfer to the cart 115 when the cart 115 may be lifted to the target location. In some aspects, the plurality of power sources may be integrated to the vehicle sidewall 145 or may be removably attached to the vehicle sidewall 145 via the engagement structure 410. Power source 425 operation is described below.

In an exemplary aspect, the processor 230 may obtain information from the inventory database 240 (e.g., package delivery schedule, package destination locations, respective package positions in the cart 115) and a current delivery vehicle geo-location from a vehicle GPS receiver. Responsive to obtaining the information and the current delivery vehicle geo-location, the processor 230 may determine that the delivery vehicle 200 may have reached a delivery location (e.g., a first package destination location). Responsive to determining that the delivery vehicle 200 may have reached the first package destination location, the processor 230 may determine the package (e.g., the first package) to be delivered at the destination location. A person ordinarily skilled in the art may appreciate that in a single destination location, the delivery vehicle 200 may deliver one or more packages. In other words, one or more packages may have same destination location.

Responsive to determining that the delivery vehicle 200 needs to deliver the first package, the processor 230 may determine first package position in the cart 115 (using the inventory database 240). The processor 230 may further illuminate a corresponding cart portion (e.g., cart front cover) to indicate the first package position (e.g., cart shelf location), as shown in FIG. 4. Thus, the processor 230 provides visual indication to the operator 110 so that the operator 110 delivers correct package at correct delivery location.

Figure 5:
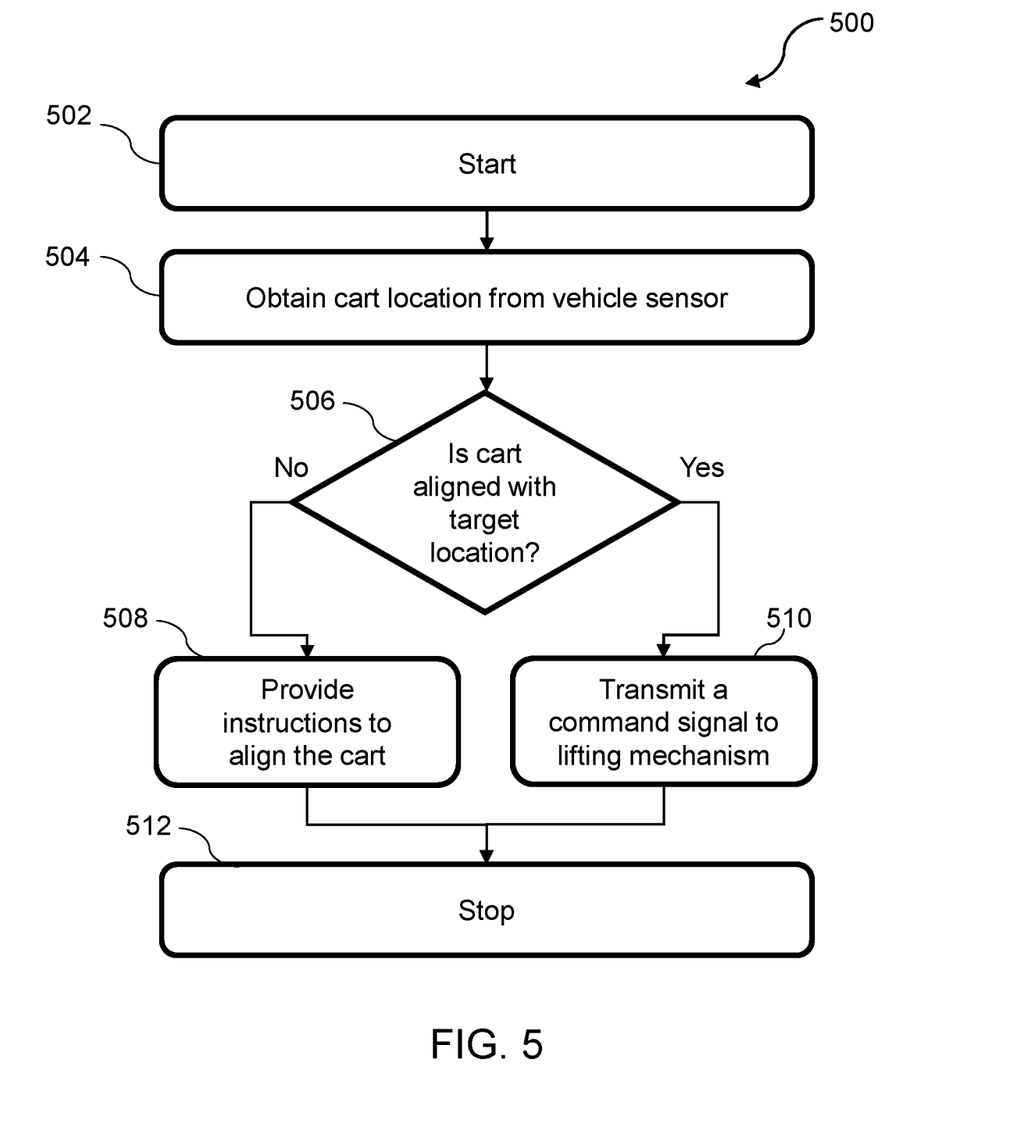
FIG. 5 depicts a flow diagram of an example method for lifting and securing cart in a delivery vehicle, in accordance with the present disclosure.

FIG. 5 depicts a flow diagram of an example method 500 for lifting and securing cart in a delivery vehicle 200, in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

Referring to FIG. 5, at step 502, the method 500 may commence. At step 504, the method 500 may include obtaining, by the processor 230, cart 115 location from the vehicle sensors (e.g., interior vehicle camera, radar sensors, etc.). In other aspects, the processor 230 may obtain the cart location from cart sensors disposed at the cart 115.

At step 506, the method 500 may include determining, by the processor 230, whether the cart 115 is aligned with a target location, based on the obtained cart location. The target location may be a location at the vehicle sidewall 145, at which the cart 115 may be secured during vehicle travel. The processor 230 may fetch the target location from the inventory database 240, and determine whether the cart 115 is aligned with the target location.

Responsive to a determination that the cart 115 may not be aligned with the target location, the processor 230 may provide instructions to the operator 110 (via user device associated with the operator 110 or vehicle audio and visual components) to align the cart 115, at step 508. In other aspects, the processor 230 may provide instructions to the cart 115 directly to align the cart 115, via self-propulsion and steering means. On the other hand, responsive to a determination that the cart 115 may be aligned with the target location, the processor 230 may transmit a command signal to the lifting mechanism 205 at step 510. The lifting mechanism 205 may then engage with the cart 115, lift the cart 115 and secure the cart 115 above the vehicle floor 150.

The method 500 ends at step 512.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a vehicle sensor configured to detect a location of a cart inside the vehicle;
   a lifting mechanism disposed at a vehicle sidewall, wherein the lifting mechanism is configured to lift and secure the cart on a target location on the vehicle sidewall; and
   at least one processor communicatively coupled to the vehicle sensor and the lifting mechanism, wherein the at least one processor is configured to:
   obtain the location of the cart from the vehicle sensor;
   determine that the cart is aligned with the target location based on the location of the cart; and
   transmit a command signal to the lifting mechanism to lift and secure the cart on the target location responsive to a determination that the cart is aligned.

2. The vehicle of claim 1, wherein the lifting mechanism comprises a lever based mechanism.

3. The vehicle of claim 1, wherein the vehicle comprises tracks on a vehicle floor to guide cart movement inside the vehicle.

4. The vehicle of claim 1, wherein the vehicle sensor comprises a vehicle camera and/or radar.

5. The vehicle of claim 1, wherein the vehicle comprises a power source configured to supply power to the cart when the cart is secured at the target location.

6. The vehicle of claim 5, wherein the power source comprises an inductive power transfer coil.

7. The vehicle of claim 1, wherein the processor is further configured to provide notification to a user device to align the cart with the target location, responsive to a determination that the cart is not aligned.

8. The vehicle of claim 1, wherein the lifting mechanism comprises:

a first vertical member and a second vertical member;

a first cross-tube and a second cross-tube connected between the first vertical member and the second vertical member;

a cable arrangement configured to engage with the cart; and a motor disposed at the first cross-tube, wherein the motor is configured to drive the cable arrangement to lift and secure the cart at the target location.

9. A method for managing a cart in a vehicle, the method comprising:

obtaining, by a processor, a location of a cart from a vehicle sensor, wherein the vehicle sensor is configured to detect the location of the cart inside the vehicle;

determining, by the processor, that the cart is aligned with a target location based on the location of the cart, wherein the target location is located on a vehicle sidewall; and transmitting, by the processor, a command signal to a lifting mechanism to lift and secure the cart on the target location responsive to a determination that the cart is aligned, wherein the lifting mechanism is disposed at the vehicle sidewall, and wherein the lifting mechanism is configured to lift and secure the cart on the target location.

10. The method of claim 9, wherein the lifting mechanism comprises a lever based mechanism.

11. The method of claim 9, wherein the vehicle comprises tracks on a vehicle floor to guide cart movement inside the vehicle.

12. The method of claim 9, wherein the vehicle sensor comprises a vehicle camera and/or radar.

13. The method of claim 9, wherein the vehicle comprises a power source configured to supply power to the cart when the cart is secured at the target location.

14. The method of claim 13, wherein the power source comprises inductive power transfer coil.

15. The method of claim 9 further comprising providing notification to a user device to align the cart with the target location, responsive to a determination that the cart is not aligned.

16. The method of claim 9, wherein the lifting mechanism comprises:

a first vertical member and a second vertical member;

a first cross-tube and a second cross-tube connected between the first vertical member and the second vertical member;

a cable arrangement configured to engage with the cart; and a motor disposed at the first cross-tube, wherein the motor is configured to drive the cable arrangement to lift and secure the cart at the target location.

17. A non-transitory computer-readable storage medium in a distributed computing system, the non-transitory computer-readable storage medium having instructions stored thereupon which, when executed by a processor, cause the processor to:

obtain a location of a cart having from a vehicle sensor, wherein the vehicle sensor is configured to detect the location of the cart inside a vehicle;

determine that the cart is aligned with a target location based on the location of the cart, wherein the target location is located on a vehicle sidewall; and transmit a command signal to a lifting mechanism to lift and secure the cart on the target location responsive to a determination that the cart is aligned, wherein the lifting mechanism is disposed at the vehicle sidewall, and wherein the lifting mechanism is configured to lift and secure the cart on the target location.

18. The non-transitory computer-readable storage medium of claim 17, wherein the lifting mechanism comprises a lever based mechanism.

19. The non-transitory computer-readable storage medium of claim 17, wherein the vehicle comprises tracks on a vehicle floor to guide cart movement inside the vehicle.

20. The non-transitory computer-readable storage medium of claim 17, wherein the vehicle sensor comprises a vehicle camera and/or radar.

* * * * *